Aug. 15, 1950     K. R. WEISE ET AL     2,519,165
ELECTRICAL CURRENT COLLECTOR

Filed May 30, 1945     2 Sheets-Sheet 1

INVENTORS
KURT R. WEISE
HARRY A. COTESWORTH
BY Kwis Hudson Boughton & Williams
ATTORNEYS

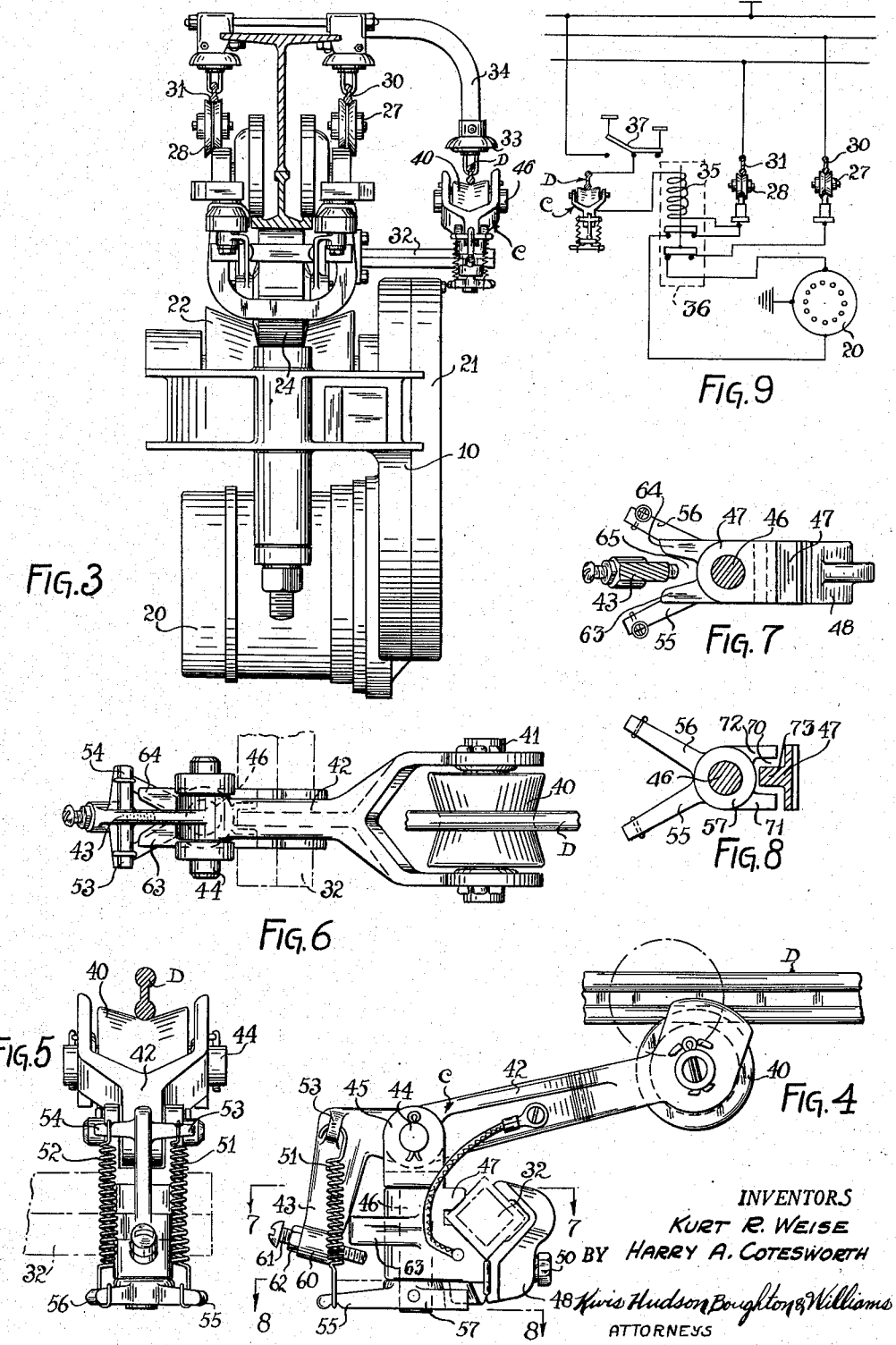

Patented Aug. 15, 1950

2,519,165

UNITED STATES PATENT OFFICE 2,519,165

ELECTRICAL CURRENT COLLECTOR

Kurt R. Weise, University Heights, and Harry A. Cotesworth, Cleveland, Ohio, assignors to The Cleveland Crane & Engineering Company, Wickliffe, Ohio, a corporation of Ohio Application May 30, 1945, Serial No. 596,708

10 Claims. (Cl. 191—60)

The present invention relates to overhead carrier systems and, more particularly, to an overhead tramrail carrier system, the carrier or carriers of which comprise a selectively operable device.

One of the principal objects of the invention is the provision of a novel and improved, overhead tramrail carrier system comprising a carrier having an electrically-operated device, in combination with means for selectively actuating the electrically-operated device from a remote station while the carrier is on a predetermined limited portion of the system.

Another object of the invention is the provision of a novel and improved, overhead tramrail carrier system comprising a carrier having an electrically-operated device, in combination with means for selectively actuating the electrically-operated device from a remote station while the carrier of which it is a part is on a predetermined limited portion of the system comprising a section of trolley conductor bar paralleling a limited portion of the trackway, and a current collector on the carrier having the head thereof supported for rotation about two axes extending at right angles with respect to each other.

Another object of the invention is the provision of a novel and improved current collector adapted to engage an interrupted trolley conductor bar, which current collector comprises a comparatively wide wheel having a concave periphery rotatably connected to a member pivotally supported for rotation about two axes, one of which is parallel with the axis of rotation of the wheel and the other of which extends in a direction at right angles thereto.

A further object of the invention is the provision of a novel and improved current collector adapted to engage an interrupted trolley conductor bar, which current collector comprises a comparatively wide wheel having a concave periphery rotatably connected to a member pivotally supported for rotation about two axes, one of which is parallel with the axis of rotation of the wheel and the other of which extends in a direction at right angles thereto, in combination with means for limiting the movement of the member about said axes when the wheel is disengaged from the trolley conductor bar, and means for continuously urging said member in a direction to engage the wheel with the trolley collector bar.

The invention resides in certain constructions and combinations and arrangements of parts and further objects and advantages will be apparent to those skilled in the art to which it relates from the following description of the preferred embodiment described with reference to the accompanying drawings forming a part of this specification, and in which:

Fig. 3 is a sectional view approximately on the line 3—3 of Fig. 2;

Fig. 4 is an enlarged view of a portion of Fig. 2;

Fig. 5 is an elevational view of the left-hand end of the current collector as viewed in Fig. 4;

Fig. 6 is a plan view of the current collector shown in Figs. 4 and 5;

Fig. 7 is a sectional view of the current collector approximately on the line 7—7 of Fig. 4;

Fig. 8 is a sectional view of the current collector approximately on the line 8—8 of Fig. 4; and Fig. 9 is a schematic wiring diagram of part of the electrical circuits of the carrier system shown in Fig. 1.

Figure 1:
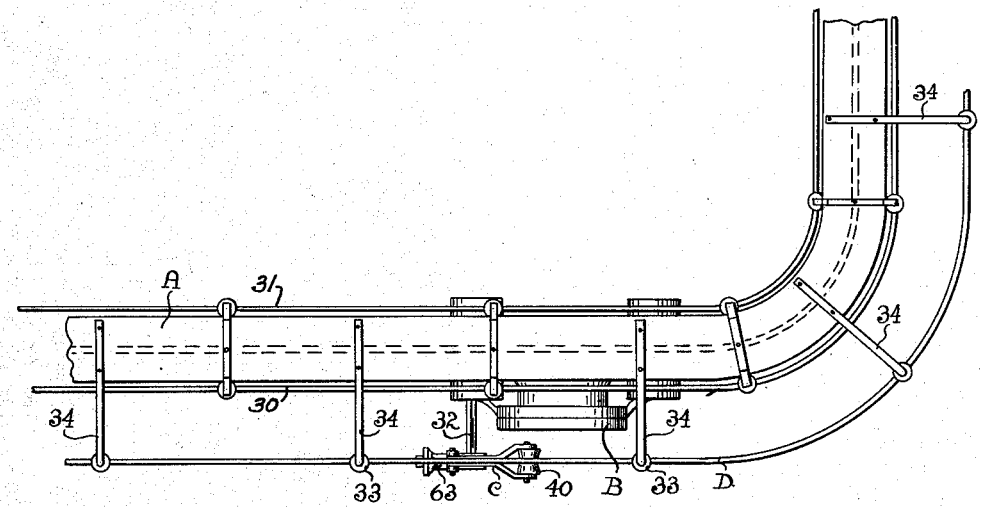
Fig. 1 is a plan view of a portion of an overhead monorail carrier system embodying the present invention.

The invention is herein illustrated and described as embodied in a material handling, electrified overhead tramrail carrier system of the monorail type manufactured by The Cleveland Crane & Engineering Company and known commercially as "Cleveland Tramrail." In the system shown, it is desired to selectively stop and subsequently start, from a remote station, the motor-driven carrier or tractor while it is on a predetermined limited part of the system. It is to be understood, however, that the invention is susceptible of various modifications and alternative constructions and is applicable to material handling systems other than the particular system illustrated and to performing functions on the carrier other than the particular function shown. For the most part, the material handling system shown and described herein is well-known in the art and only those parts which are necessary to a complete understanding of the invention are herein illustrated and described in detail.

Referring to the drawings, only a very limited portion of the system is shown, however, the portion shown includes a station or section of track at which it is desired to selectively stop the carriers. Generally speaking, the system comprises an overhead monorail A supported from above in some suitable manner and along the lower flanges of which the carriers are adapted to travel. For purposes of illustration, a tractor B similar to that disclosed and claimed in U. S. Patent to Anjeskey, No. 2,318,354 is shown as distinguished from a motor-driven carrier.

The tractor B comprises a frame 10, opposite ends of which are suspended from the carrier rail A by round bars 11, 12 welded to the lower ends of U-shaped members 13, 14, the upward ends of which project upwardly along opposite sides of the rail A and have pairs of supporting wheels 15, 16, respectively, connected thereto. The tractor is driven or propelled along the rail A by an electric motor 20 bolted to the frame 10 and operatively connected by gearing enclosed within the frame and accessible through a cover 21. The gearing referred to connects the motor 20 to an hourglass-shaped wheel 22 rotatably supported in the frame 10 and located midway between the ends of the tractor. The hourglass-shaped wheel 22 is continuously engaged by a plurality of wheels 23, 24 rotatably connected to brackets 25, 26 pivotally connected to the frame 10, the upper sides of which wheels engage the underside of the carrier rail A. Resilient means, not shown, but interposed between the frame 10 and the members 11, 12, continuously urge the frame 10 in an upward direction, thus maintaining the wheels 23, 24 in engagement with the carrier track A and the hourglass-shaped wheel 22. The construction is such that the tractor A is propelled along the carrier track by the wheels 23, 24 upon operation of the motor 20.

The motor 20 shown is a three-phase alternating current motor and the current for operating the same is supplied thereto by a pair of current collectors 27, 28 of commercial construction located at opposite sides of the carrier rail A. The current collectors 27, 28 are in continuous engagement with trolley conductor bars 30, 31 also located at opposite sides of the carrier rail A and connected thereto in a conventional manner. The third rail, in the present instance, is the carrier rail A. The construction thus far described is substantially the same as that shown in the aforesaid patent and per se forms no part of the present invention.

The present invention contemplates the provision of means for selectively performing some function on the carrier at a predetermined point or station in the system or section of carrier track A. In the present instance, the function is that of selectively stopping and starting the tractor B without disconnecting the current supply to the trolley conductors 30, 31 and the third rail. For this purpose, the tractor B is provided with a current collector C adjustably connected to a square bar 32 welded to the U-shaped member 14, hereinafter specifically described, which current collector is adapted to engage a short length of trolley conductor bar D located at the station or section of track at which it is desired to stop the tractor. The trolley conductor bar D may be supported adjacent to the carrier rail A in any convenient manner. As shown, it is connected by suitable insulators 33 to lower ends of brackets 34 fixed to the top of the carrier rail A.

The current collector C is connected in series circuit with the operating solenoid 35 of a normally closed relay 36, which relay is located on the tractor and is adapted to break the circuit between the current collectors 27, 28 and the motor 20 when the operating solenoid 35 is energized. Current is selectively supplied to the operating solenoid 35 of the relay 36 by a push button switch 37 having both an "on" and an "off" position located at some convenient place remote from the carrier track A and the tractor B. Alternatively the push button switch 37 may be replaced by a limit switch or some similar device to meet varying requirements. The switch 37 is connected in series circuit between the source of current supply and the short section of trolley conductor bar D, as will be readily understood from the wiring diagram, Fig. 9. The construction is such that the tractor B can be stopped when it is traveling on that part of the system provided with the trolley conductor bar D by merely pressing the switch 37 to close the circuit to the operating solenoid 35 of the relay 36. When it is desired to again start the trolley, it is merely necessary to open the switch 37. Obviously the control circuits shown may be employed to perform any desired function on the tractor other than that of disconnecting the circuit to the drive motor and causing the tractor to stop.

With the present construction, operation can be performed on the tractor or carrier at predetermined locations about the system without the necessity of extending the trolley conductor bar D throughout the entire system, thus saving a large amount of trolley conductor bar and reducing the cost of the system materially. When short sections of trolley conductor bars are employed, the current collector which cooperates therewith must disengage and reengage the trolley conductor bars, which requires the provision of some means for controlling the position of the contact member of the current collector when it is free of the trolley conductor bar, which means will nevertheless permit the contact member to follow curves or other irregularities in the trolley conductor bar when engaged therewith.

Referring particularly to Figs. 4 to 8, inclusive, the current collector C comprises a contact or trolley wheel 40 rotatably supported on a tubular shaft 41 fixedly secured in the right-hand end of a forked arm 42, which arm has a downwardly extending projection 43 at the left-hand end and is pivotally supported adjacent to its left-hand end for rotation about a horizontal axis by a pin 44 extending therethrough and through suitable apertures in the upper end of a U-shaped member 45 having a downwardly extending cylindrical shank 46 supported for rotation about a vertical axis in a suitable aperture in a two-part bracket 47, 48 adapted to be fixedly secured to the bar 32 by a bolt 50.

The trolley wheel 40 is hourglass or concave in shape and is comparatively wide so that it will readily follow the trolley conductor bar regardless of what curves or other irregularities may be encountered. While the depression at the center of the wheel 40 is comparatively shallow, it will follow the trolley conductor bar around curves and the like. For safety reasons, the ends of the arm 42 between which the trolley wheel 40 is supported, are extended upwardly at either side of the trolley wheel, as clearly shown in Fig. 4, to eliminate any possibility of the wheel not properly following the trolley conductor bar.

The arm 42 is continuously urged in a direction to engage the trolley wheel 40 with the trolley conductor bar D by a pair of tension springs 51, 52 connected to lugs or projections 53, 54 formed integral with the left-hand end of the arm 42 and two arms or projections 55, 56 on a member 57 fixed to the lower end of the shank 46 of the member 45. The axis of the cylindrical shank 46 of the member 45 is at right angles to and intersects the center of the trolley conductor bar D and the axis of the pivot 44 is at right angles to the axis of the member 45. The construction thus far described would be sufficient if the trolley wheel 40 was to be continuously engaged with the trolley conductor bar D, however, this is not the case and the present invention contemplates the provision of means for limiting the upward movement of the trolley wheel 40 and the rotation of the arm 42 about the vertical axis of the shank 46 when the trolley wheel 40 is out of engagement with the trolley conductor bar so that the trolley wheel will be in position to re-engage the trolley conductor bar as the tractor approaches the section of trolley conductor bar D or some other similar section or sections positioned at desired locations about the system.

Figure 2:
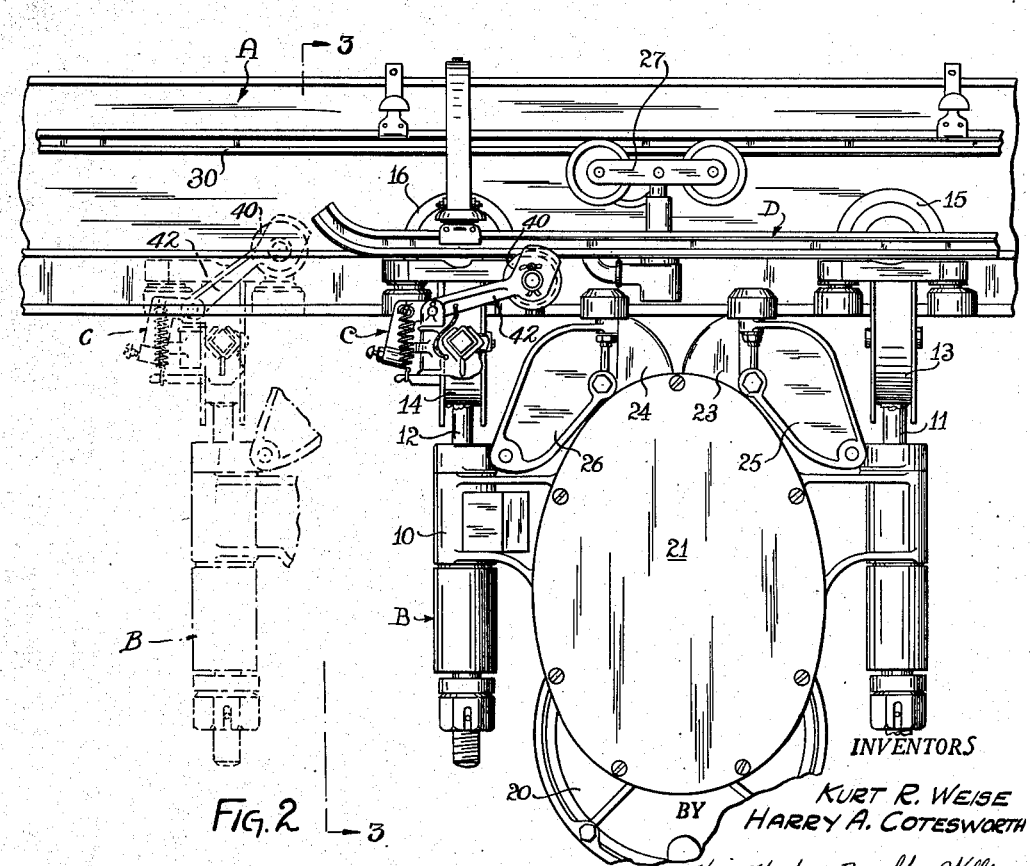
Fig. 2 is a side elevational view of a portion of the overhead monorail system shown in Fig. 1.

For the purpose of limiting the rotation of the arm 42 about the horizontal pivot 44 and, in turn, the upward movement of the trolley wheel 40, the arm 42 includes a boss 60 at the lower end of the extension 43, which boss is provided with an adjustable screw 61 adapted to be retained in any adjusted position by a jam nut 62. The right-hand end of the screw 61 is adapted to engage the bracket 47. The approximate upper limit of travel of the trolley wheel 40 is shown in dot-dash lines in Figs. 2 and 4.

For the purpose of limiting the rotation of the arm 42 about the vertical pivot 46 when the trolley wheel 40 is disengaged from the trolley conductor bar, the bracket 47 is provided with a pair of projections 63, 64, which projections form a V-shaped groove 65 into which the downwardly extending part 43 of the arm 42 engages as the trolley wheel 40 leaves the end of the trolley conductor bar D. When the trolley wheel 40 is in engagement with the trolley conductor bar, the arm 42 is depressed sufficiently to either free the extension 43 from the projections 63, 64 or to position it in the wide portion of the groove 65 where the projections 63, 64 will not interfere with the normal operation of the arm 42. Alternatively, the extension 43 could have the groove 65 therein, etc.

The right-hand end of the member 57, as viewed in Figs. 4 and 8, is provided with a wide groove 70 formed by projections 71, 72 into which groove a projection 73 on the member 47 extends to limit the rotation of the member 57 and, in turn, rotation of the member 45. From the foregoing it will be seen that the rotation of the arm 42 about the vertical axis of the shank 46 is limited not only by engagement of the extension 43 with the projections 63, 64 but also by the engagement of the projection 73 with the projections 71, 72. The projection 73, in cooperation with the springs 51, 52, makes it impossible for the extension 43 of the arm 42 to become disaligned with the groove 65, even though the extension 43 may be free of the projections 63, 64.

From the foregoing it will be apparent that the objects of the invention heretofore enumerated and others have been accomplished and that there has been provided a novel and improved carrier system comprising a carrier or carriers having an electrically-operated device controlled from a remote location when the carrier or carriers are traveling on a predetermined part of the system. It will also be apparent that a new and improved current collector has been provided which is especially adaptable to cooperate with an intermittent trolley conductor bar.

While the preferred embodiment of the invention has been described in considerable detail, the invention is not limited to the particular construction shown, and it is our intention to hereby cover all adaptations, modifications and its uses thereof which come within the practice of those skilled in the art to which the invention relates.

Having thus described our invention, what we claim is:

1. A current collector comprising an arm member, a contact member adapted to engage a trolley conductor, means supporting said contact member in said arm member adjacent to one end thereof, a frame member adapted to be connected to a carrier, an intermediate member supported in said frame member for rotation about an axis at right angles to and intersecting the trolley conductor, a shaft journaled in said intermediate member and supporting said arm for oscillation about an axis at right angles to the first-mentioned axis, means continuously urging said arm member in a direction to engage said contact member with the trolley conductor, and a pair of spaced diverging projections on said frame member adapted to receive a portion of the arm member therebetween for limiting the oscillation of said arm member about said first-mentioned axis.

2. A current collector comprising an arm, a frame member adapted to be connected to a carrier, an intermediate member supported in said frame member for rotation about an axis at right angles to and intersecting the trolley conductor, said intermediate member having one end thereof bifurcated, a shaft carried by the bifurcated end of said intermediate member and supporting said arm for oscillation about an axis at right angles to the first-mentioned axis, a contact member carried by said arm member adjacent to one end thereof, means yieldably urging said arm member in a direction to engage said contact member with the trolley conductor, a pair of spaced diverging projections on said frame member, and an extension on said arm positioned between said projections for limiting the oscillation of said arm member about said first-mentioned axis.

3. In a carrier system, the combination of a carrier supporting rail, a carrier movable along said rail, a trolley conductor extending along a limited portion of said rail, a contact member engageable with said trolley conductor, means connecting said contact member to said carrier for rotation about an axis normal to and intersecting the trolley conductor when the carrier is on said portion of said rail having said trolley conductor adjacent thereto, and means comprising a pair of stationary spaced projections cooperating with the means for connecting the contact member to said carrier for limiting the movement of said contact member about said axis.

4. In an overhead underslung monorail carrier system, the combination of an overhead monorail, an underslung carrier movable along said rail, a trolley conductor extending along a limited portion of said rail, a contact member engageable with said trolley conductor, means connecting said contact member to said carrier for rotation about an axis normal to and intersecting the trolley conductor when the carrier is on the portion of said rail adjacent to said trolley conductor, and means for limiting the movement of said contact member about said axis.

5. A current collector, comprising an arm member, a contact member adapted to engage a trolley conductor, means supporting said contact member in said arm member adjacent to one end thereof, a frame member adapted to be connected to a carrier, an intermediate member supported in said frame member for rotation about an axis at right angles to and intersecting the trolley conductor, a shaft journaled in said intermediate member and supporting said arm for oscillation about an axis at right angles to the first-mentioned axis, means continuously urging said arm member in a direction to engage said contact member with the trolley conductor, and a pair of spaced projections on said intermediate member cooperating with a portion of the frame member located therebetween for limiting the oscillation of said arm member about said first mentioned axis.

6. A current collector comprising an arm having a bifurcated end, a trolley conductor engaging wheel rotatably mounted in the bifurcated end of said arm, the outer ends of the bifurcated portions of said arm having projections extending above the periphery of the wheel and the said wheel being relatively wide and having a concave periphery to assist the latter in following the trolley conductor, a frame member adapted to be rigidly connected to a carrier, an intermediate member supported in said frame member for rotation about an axis at right angles to and intersecting the trolley conductor, means supporting said arm in said intermediate member for oscillation about an axis at right angles to the first-mentioned axis, means yieldably urging said arm member in a direction to engage said wheel with the trolley conductor, a pair of spaced diverging projections on said frame member, and an extension on said arm normally positioned between said projections for limiting the oscillation of said arm member about said first-mentioned axis, the said projections diverging in a direction to permit greater movement of said arm member as it moves in a direction away from the trolley.

7. In an overhead underslung monorail carrier system, the combination of an overhead monorail, an underslung carrier movable along said rail, a trolley conductor extending along a limited portion of said rail, a frame member adapted to be rigidly attached to said carrier, an intermediate member supported for rotation in said frame member about an axis normal to and intersecting the trolley conductor when the carrier is on a portion of said rail adjacent to said trolley conductor, a contact member engageable with said trolley conductor, means supporting said contact member upon said intermediate member, means urging the contact member into engagement with the conductor, and means for limiting the movement of said contact member and intermediate member about said axis, the last-mentioned means including a pair of spaced projections on said frame with a portion of the means for mounting the contact member extending therebetween for limiting the movement of the contact member the said axis when the contact member is out of engagement with the trolley conductor.

8. In an overhead underslung monorail carrier system, the combination of an overhead monorail, an underslung carrier movable along said rail, a trolley conductor extending along a limited portion of said rail, a frame member mounted on said carrier, an intermediate member journaled in said frame member for rotation about an axis normal to and intersecting the trolley conductor when the carrier is on a portion of the said rail adjacent to said conductor, an arm member pivotally connected to said intermediate member for rocking movement about an axis perpendicular to the first-mentioned axis, one end of said arm member being bifurcated, a concave trolley wheel journaled between the bifurcated portions of said arm, means cooperating with said arm for resiliently urging said trolley wheel in a direction to engage said conductor, and means for limiting the movement of said arm member about the first-mentioned axis, whereby said trolley wheel may follow curves in said trolley conductor when in engagement therewith and will be maintained in proper position for re-engaging said trolley when said carrier is moving along the portion of the monorail adjacent which there is no trolley conductor.

9. A current collector for cooperation with a trolley conductor of limited length, the said collector comprising a frame member adapted to be connected to a body movable adjacent the trolley, an intermediate member supported in said frame member for rotation about an axis extending at right angles to and intersecting the trolley conductor, an arm member, means pivotally supporting said arm member on said intermediate member for oscillation about an axis extending at right angles to the first-mentioned axis, a trolley contacting member supported by said arm member adjacent an end thereof, yieldable means continuously urging said arm member in a direction to effect engagement of said contact member with the trolley conductor, and a pair of diverging projections on said frame member adapted to receive and centralize a portion of said arm member therebetween when the arm member is moved under the influence of said yieldable means upon disengagement of the contact member from said trolley conductor thereby preventing rotation of said intermediate and arm members about said first-mentioned axis so that the contact member is retained in proper position for reengagement with the said trolley conductor.

10. A current collector as defined in claim 9 and further comprising a pair of spaced projections on said intermediate member cooperating with a portion of the frame member for limiting the oscillations of said intermediate and arm members about said first-mentioned axis whether or not the said contact member is in engagement with the trolley conductor.

KURT R. WEISE.
HARRY A. COTESWORTH.

REFERENCES CITED

The following references are of record in the file of this patent:

UNITED STATES PATENTS

| Number | Name | Date |
|---|---|---|
| 522,915 | McBean | July 10, 1894 |
| 775,808 | Tobin | Nov. 22, 1904 |
| 869,597 | Thompson | Oct. 29, 1907 |
| 872,802 | Ehmann | Dec. 3, 1907 |
| 1,020,794 | Bluhm | Mar. 19, 1912 |
| 1,349,230 | Skublin | Aug. 10, 1920 |
| 1,357,630 | Freeman | Nov. 2, 1920 |
| 1,383,796 | Freeman | July 5, 1921 |
| 2,304,720 | Wehr | Dec. 8, 1942 |